US012591942B1

(12) United States Patent
Luck et al.

(10) Patent No.: US 12,591,942 B1
(45) Date of Patent: Mar. 31, 2026

(54) PERSONALIZED PROPERTY RECOMMENDER SYSTEM USING ARTIFICIAL REALITY AND MACHINE LEARNING

(71) Applicant: UIPCO, LLC, San Antonio, TX (US)

(72) Inventors: Gideon Bowie Luck, Plano, TX (US); Donnette L. Moncrief Brown, San Antonio, TX (US); Matthew Robert Byrd, Weatherford, TX (US); Rincy Raju George, Garland, TX (US); Bradly Jay Billman, Celina, TX (US); Huihui Wu, Grapevine, TX (US); Surender Kumar, Palatine, IL (US)

(73) Assignee: United Services Automobile Association (USAA), San Antonio, TX (US)

( * ) Notice: Subject to any disclaimer, the term of this patent is extended or adjusted under 35 U.S.C. 154(b) by 115 days.

(21) Appl. No.: 18/428,678

(22) Filed: Jan. 31, 2024

(51) Int. Cl.
| | |
|---|---|
| *G06Q 50/16* | (2024.01) |
| *G06F 40/40* | (2020.01) |
| *G06T 19/00* | (2011.01) |

(52) U.S. Cl.
CPC ........... *G06Q 50/165* (2013.01); *G06F 40/40* (2020.01); *G06T 19/006* (2013.01)

(58) Field of Classification Search
CPC .... G06Q 50/16; G06Q 50/163; G06Q 50/165; G06Q 50/14; G06Q 10/02; G06Q 10/20;
(Continued)

(56) References Cited

U.S. PATENT DOCUMENTS

| | | | | |
|---|---|---|---|---|
| 11,145,016 B1* | 10/2021 | Brophy | ............. | G07C 9/00571 |
| 2012/0084248 A1 | 4/2012 | Gavrilescu | | |

(Continued)

FOREIGN PATENT DOCUMENTS

WO    WO 2024057301    *  3/2024  ............. G06Q 40/06

OTHER PUBLICATIONS

Parameswaran et al, Accommodation Finder: An Augmented Reality Based Mobile Application Integrated with Smart Contracts, 2021 3rd Int'l Conference on Advancements in Computing (ICAC), pp. 341-346 (Year: 2021).*

(Continued)

*Primary Examiner* — Michael P Harrington
*Assistant Examiner* — Mark C Clare
(74) *Attorney, Agent, or Firm* — Potomac Law Group, PLLC; Dannon G. Allbee

(57) ABSTRACT

Implementations generate personalized property recommendations based on experiential data obtained via artificial reality systems and machine learning predictions that correlate user preferences to these properties. A user can be one or more persons interested in purchasing a property, such as a new home. A property buying workflow often includes defining a set of preferences for a desired property and comparing properties for sale with these defined preferences. However, in a conventional buying workflow, defining preferences and doing the comparison is left up to the user and/or the user's real estate agent. Users can often feel overwhelmed by the information, in particular users that do not have previous buying experience. Implementations can integrate machine learning and artificial reality systems into the property buying experience to mitigate the information overload problem and provide meaningful recommendations to the user, such as a ranking of properties that comply with user's preferences.

20 Claims, 11 Drawing Sheets

(58) Field of Classification Search
CPC ....... G06F 40/40; G06T 19/006; G06V 20/20; Y10S 707/946; A61B 2090/365; G01C 21/3484; G01C 21/343; G01C 21/2476
USPC ........................................................ 705/313
See application file for complete search history.

(56) References Cited

U.S. PATENT DOCUMENTS

| | | | |
|---|---|---|---|
| 2012/0323928 A1 | 12/2012 | Bhatia | |
| 2015/0248721 A1 | 9/2015 | Brown | |
| 2015/0262208 A1* | 9/2015 | Bjontegard | G06Q 30/0205 |
| | | | 705/7.31 |
| 2015/0302522 A1 | 10/2015 | Howe | |
| 2017/0154337 A1 | 6/2017 | Wingate-Whyte et al. | |
| 2018/0218303 A1 | 8/2018 | Cole et al. | |
| 2018/0349489 A1 | 12/2018 | Toudji et al. | |
| 2018/0374276 A1* | 12/2018 | Powers | G06T 17/205 |
| 2019/0391827 A1 | 12/2019 | Simanovich et al. | |
| 2020/0137438 A1 | 4/2020 | Whitman et al. | |
| 2020/0342550 A1 | 10/2020 | Halimsaputera | |
| 2020/0411159 A1 | 12/2020 | Chien et al. | |
| 2021/0027357 A1 | 1/2021 | Bonfigli et al. | |
| 2021/0133782 A1 | 5/2021 | Mahajan et al. | |
| 2021/0248696 A1* | 8/2021 | Reis | G06F 16/248 |
| 2021/0264479 A1* | 8/2021 | Reis | G06Q 30/0643 |
| 2022/0172309 A1* | 6/2022 | Corona Pompa | G06Q 30/06 |
| 2022/0327642 A1* | 10/2022 | Kabir | G06Q 50/16 |
| 2022/0351300 A1 | 11/2022 | Sakumoto et al. | |
| 2023/0185813 A1* | 6/2023 | Xu | G06Q 30/0623 |
| | | | 707/727 |
| 2023/0194753 A1 | 6/2023 | Borges Oliveira et al. | |
| 2023/0377050 A1 | 11/2023 | Umeda et al. | |
| 2025/0166100 A1* | 5/2025 | Likholyot | G06Q 50/16 |

OTHER PUBLICATIONS

Jain et al, Real Estate Market in the Digital Age: A Review of Technology Trends and Advancements, 2023 6th International Conference on Recent Trends in Advance Computing (ICRTAC), pp. 790-795 (Year: 2023).*

Singh et al, Transforming E-Commerce: Augmented Reality (AR) and Virtual Reality (VR) Integration for Interactive and Immersive Shopping Experiences, 2023 7th International Conference on Electronics, Materials Engineering & Nano-Technology (IEMENTech), pp. 1-5 (Year: 2023).*

Abbas et al., "A cloud based health insurance plan recommendation system: A user, centered approach," 2014, Future Generation Computer Systems 43-44 (2015) 9-109 (Year: 2014).

* cited by examiner

400

410

412
processing units 414
working memory

416
I/O 418
storage memory 420
mediator

430

432
interfaces 434
user preferences manager

436
XR system coordinator 438
property data aggregator 440
metrics generator 442
ranking generator 444
analytical model(s)

900

902
receive factual data about residential properties

904
receive user preferences descriptive of a desired property

906
access experiential data obtained from the residential properties

908
generate user favorability metrics

910
generate prioritized ranking

PERSONALIZED PROPERTY RECOMMENDER SYSTEM USING ARTIFICIAL REALITY AND MACHINE LEARNING

TECHNICAL FIELD

The present disclosure is directed to generating personalized property recommendations using machine learning and artificial reality.

BACKGROUND

Artificial reality has grown in popularity, and this growth is expected to accelerate. Artificial reality can include virtual reality, which refers to a computer generated artificial reality environment, and mixed reality or augmented reality, which refers to computer generated elements in combination with real-world elements. However, implementations that achieve practical applications of artificial reality systems continue to present multifaceted challenges. For example, incorporating artificial reality systems into existing workflows has remained elusive. Aligning the benefits of artificial reality systems such that they add value to users within a particular functional context can improve the technological field.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
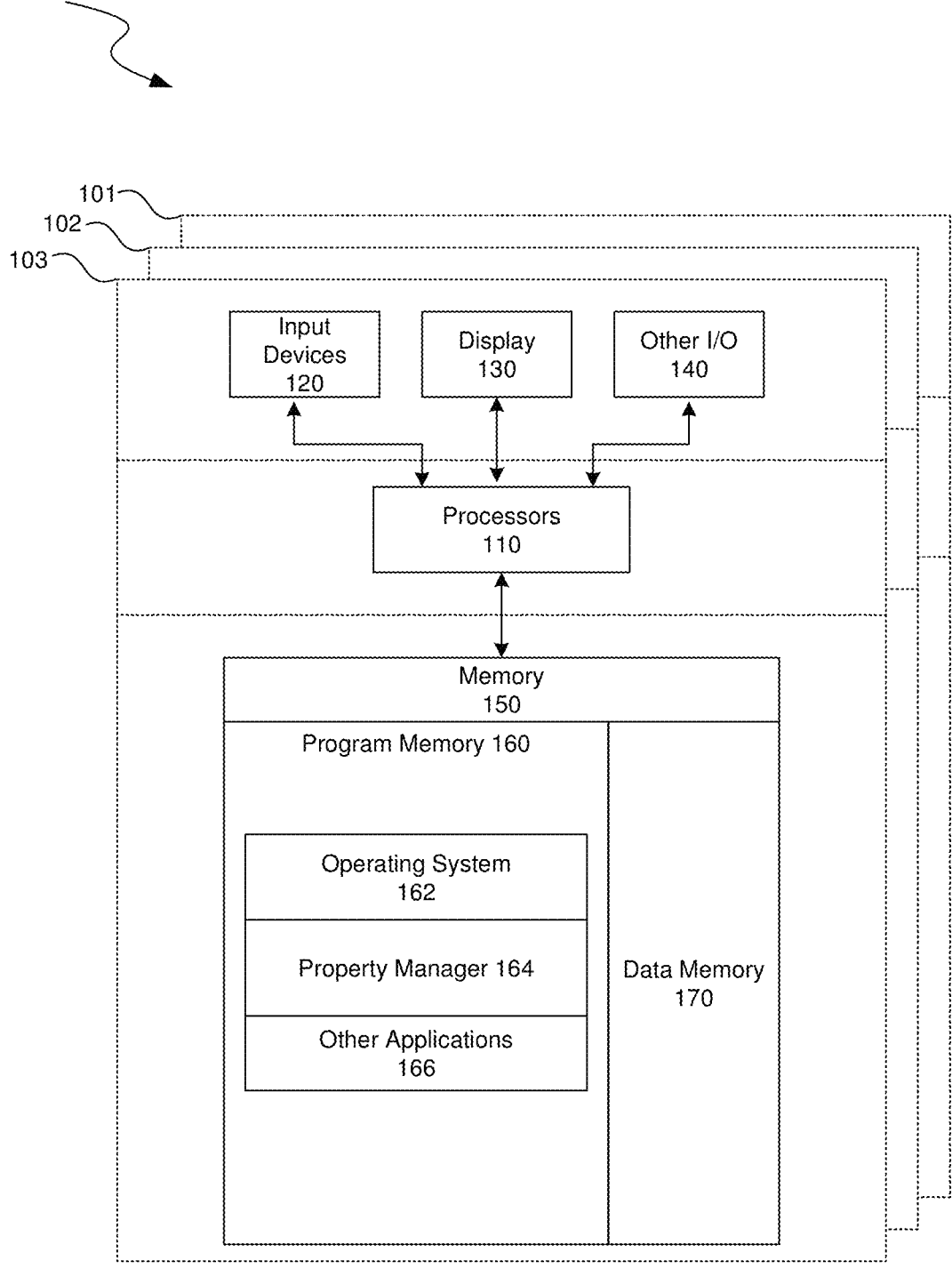
FIG. 1 is a block diagram illustrating an overview of devices on which some implementations of the present technology can operate.

Aspects of the present disclosure are directed to generating personalized property recommendations using machine learning and artificial reality. A buyer can be one or more persons interested in purchasing a property, such as a residential property, commercial property, or any other suitable property type. Property buying workflows often include defining a set of preferences for a desired property and comparing properties for sale with these defined preferences. However, the buyer is often left to perform this comparison without assistance. Implementations can integrate machine learning and artificial reality systems into the property buying experience to provide meaningful recommendations to the buyer, such as automatically determining the buyer's preferences and ranking of properties that comply with the buyer's preferences.

Implementations of a property manager can assist a user, or property buyer, in ranking properties the user is interested in purchasing. The system and/or user can define user preferences for a desired property. For example, user preferences for a residential property can include square footage range, number of bedrooms, number of bathrooms, construction date or age of home, school metric(s) for zoned schools, location preferences (e.g., zip code, proximity to landmarks/city, proximity to a highway, coordinates that define a geographic region, etc.), noise factors due to proximity to noise sources (e.g., train stations, fire stations, airports etc.), yard size, a desired floorplan (e.g., multi-floor, single story, basement, master bedroom size, kitchen size, etc.), and the like. User preferences for a commercial property can include square footage range, number of rooms (e.g., offices, conference rooms, etc.), number of bathrooms, construction date or age of building, location preferences (e.g., zip code, proximity to landmarks/city, proximity to a highway, coordinates that define a geographic region, etc.), noise factors due to proximity to noise sources (e.g., train stations, fire stations, airports etc.), a desired floorplan, and the like. The property manager can store these user preferences and, in some implementations, derive additional user preferences via user monitoring.

The property manager can also coordinate with an artificial reality system to obtain experiential data while the user experiences properties in-person. For example, the user can conduct walkthroughs of properties for sale, and the XR system can record the user experience while conducting the walkthroughs. The recorded experience (e.g., experiential data) can include a recording of the artificial reality environment displayed to the user, audio sensed during the walkthrough (e.g., natural language spoken by the user and/or others), and the like. The property manager can obtain multiple instances of experiential data as the user visits multiple properties in-person.

In some implementations, the property manager can generate user favorability metrics for the properties by analyzing the experiential data. For example, analytical model(s) can analyze natural language spoken by the user, correlate the natural language to targeted elements of the properties, and predict the user's disposition with respect to these targeted elements. Examples of user favorability metrics for a property can include: an estimated cost for purchasing and/or updating the property, the user's disposition towards portions of the property (e.g., kitchen, master bedroom, outdoor space, living area, etc.), the user's disposition towards the property location, the user's disposition on the property floorplan (e.g., room sizes, basement, layout, etc.), the user's disposition on the natural light within the property, and other suitable favorability metrics.

The property manager can generate a prioritized ranking of the properties using factual data about the properties, the user preferences, and the predicted user favorability metrics.

Factual data about the properties can include information about a physical structure, such as an age of the structure (e.g., construction date), number of rooms (e.g., bedrooms, offices, conferences room, etc.), number of bathrooms, square footage, school zone information, maintenance fees (e.g., homeowner's association fees, building fees, etc.), address and/or other location information, and the like. The property manager can compare the factual data about the properties and the predicted user favorability metrics for the properties to the user preferences to generate the ranking. The generated ranking can rank properties according to met user preferences. For example, the ranking can be based on a percentage of user preferences met (e.g., a higher percentage corresponds to a higher ranking).

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

A property buying workflow often includes defining a set of user preferences for a desired property and comparing properties for sale with these defined user preferences. However, in a conventional workflow, this definition and comparison is left up to the user. Users can often feel overwhelmed by the information, in particular users that do not have previous property buying experience. Some conventional systems permit filtering or sorting properties by certain home features (e.g., square footage, number of rooms, list price, etc.), however these conventional systems are inflexible in the types of features that can be used to filter/sort properties and lack the user's in-person perspective of the properties.

Implementations can integrate machine learning and artificial reality systems into the property buying experience to mitigate the information overload problem and provide meaningful recommendations to the user, such as possible user preferences based on observed user actions/discussion and a ranking of properties that comply with the user's preferences. These meaningful recommendations can be generated using experiential data that is reflective of the user's in-person disposition when experiencing the properties for sale. For example, artificial reality systems are leveraged during in-person walkthroughs to obtain this experiential data. Analytical model(s) can then analyze the experiential data to generate user favorability metrics that capture the user's perspective on the properties. This user perspective can be used to generate a ranking of the properties that is personalized to the user and that achieves a level of nuance that conventional systems fail to capture.

Several implementations are discussed below in more detail in reference to the figures. FIG. 1 is a block diagram illustrating an overview of devices on which some implementations of the disclosed technology can operate. The devices can comprise hardware components of a computing system 100 that generate personalized property recommendations using machine learning and artificial reality. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor (s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, property manager 164, and other application programs 166. Memory 150 can also include data memory 170 that can include, e.g., factual data descriptive of properties, experiential data descriptive of a user's experience at properties, user preferences, user favorability metrics, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
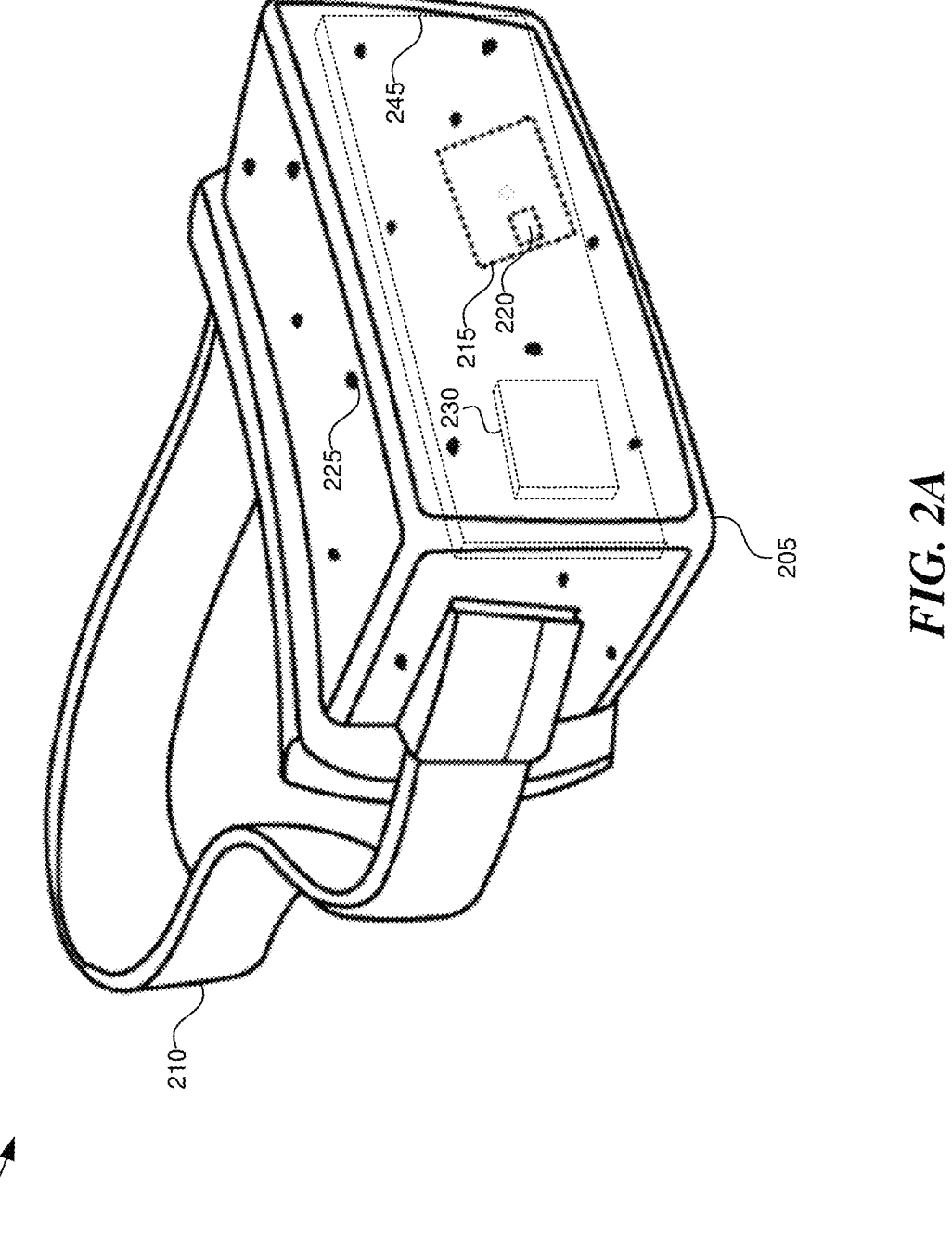
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
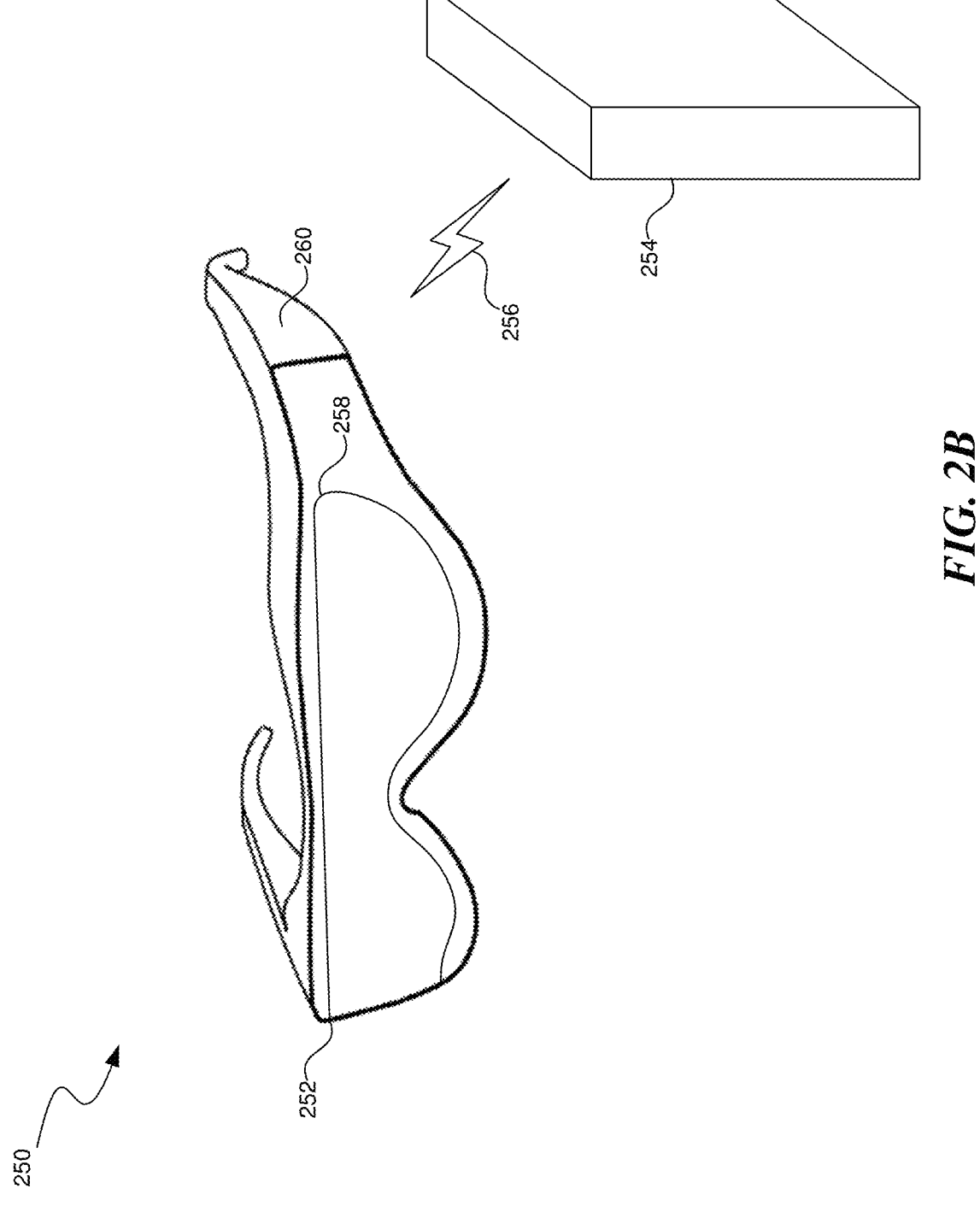
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
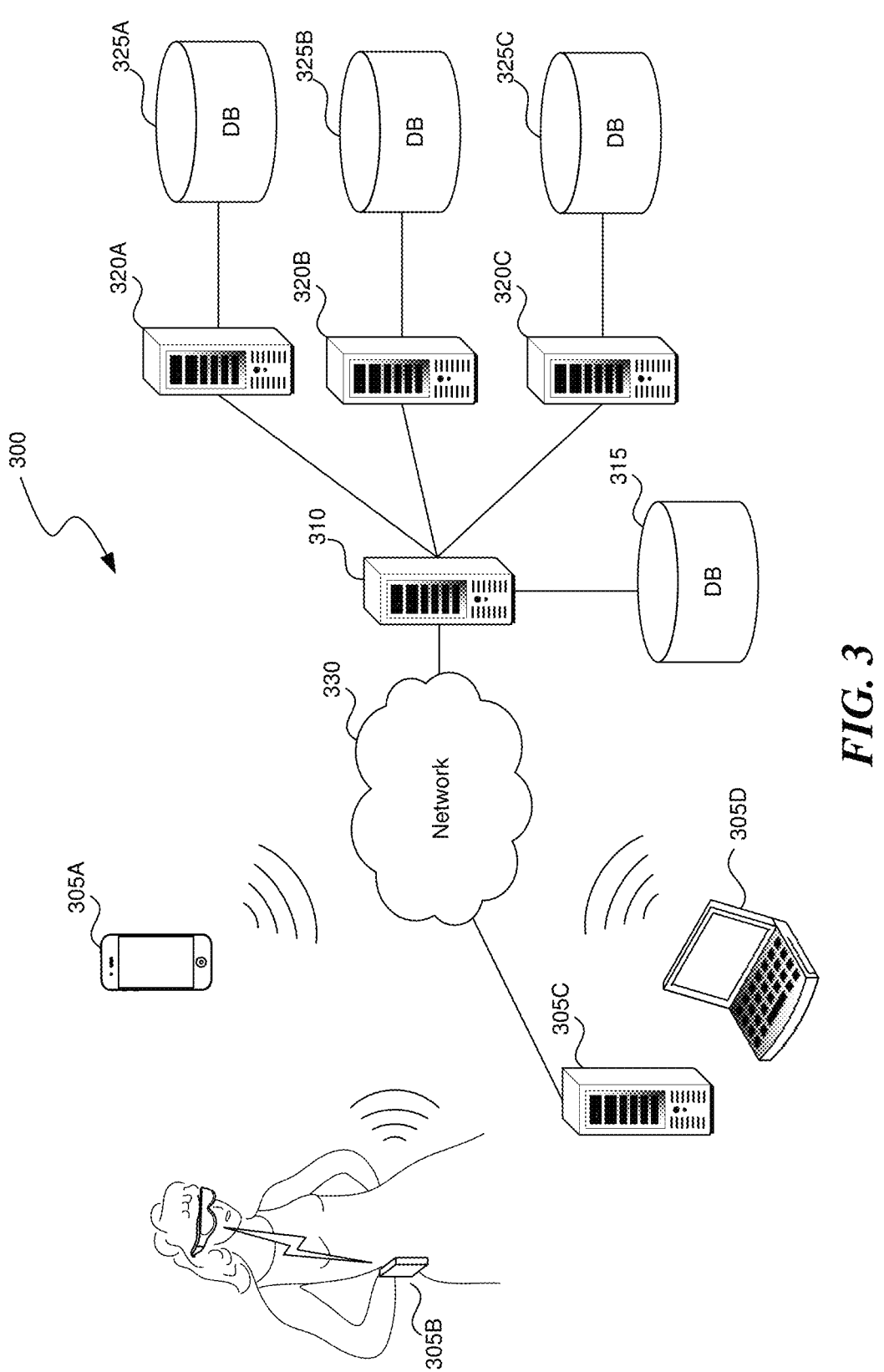
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations. Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
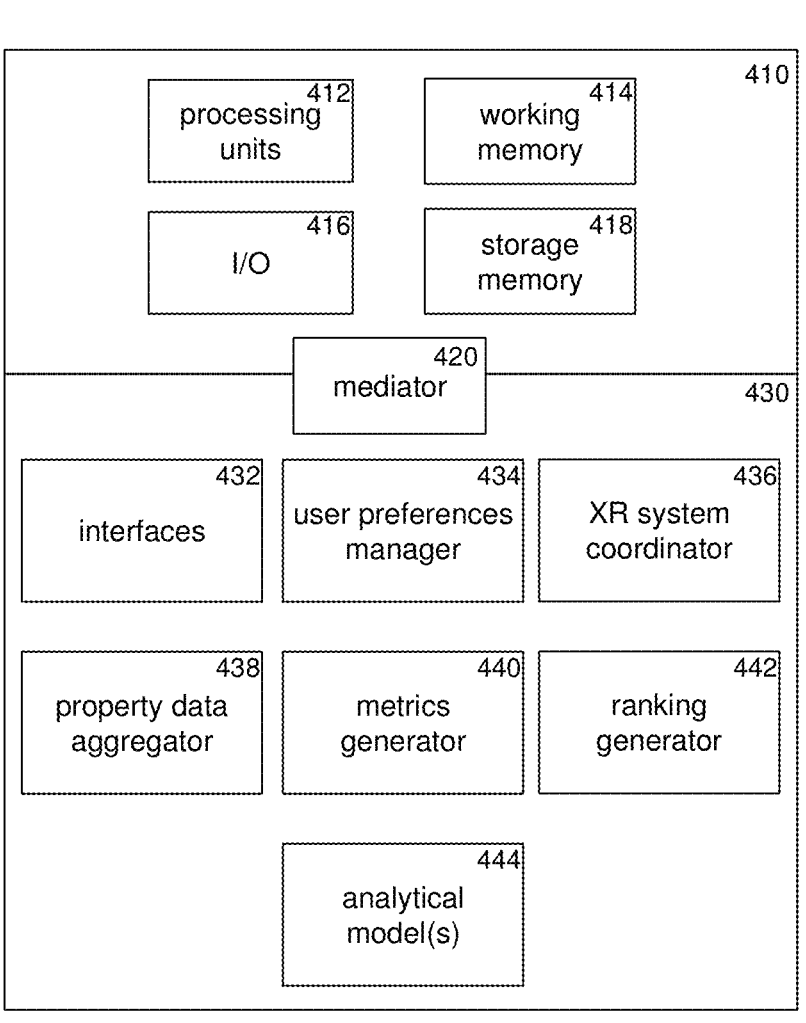
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for generating personalized property recommendations using machine learning and artificial reality. Specialized components 430 can include user preference manager 434, XR system coordinator 436, property data aggregator 438, metrics generator 440, ranking generator 442, analytical model(s) 444, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

User preferences manager 434 can manage user preferences related to a desired property. For example, the system or user can define preferences that are descriptive of a desired property (e.g., home for purchase, commercial space for sale, etc.) such as a square footage range, number of rooms, number of bathrooms, construction date or age of structure, school metric(s) for zoned schools, location preferences (e.g., zip code, proximity to landmarks/city, coordinates that define a geographic region, etc.), a desired floorplan (e.g., multi-floor, single story, basement, room size, kitchen size, etc.), and the like. User preferences manager 434 can store these user defined preferences.

In some implementations, user preferences manager 434 can derive user preferences and/or receive user preferences derived from another source (e.g., XR system coordinator 436). For example, these user preferences can be derived based on factual data of properties shortlisted by the user, observed user behaviors in the user's home (e.g., observed during a monitoring period), the user's language while viewing properties for sale, other detected user behaviors while viewing properties for sale (e.g., gaze tracking, amount of time spent in a portion of a home for sale, etc.), any combination thereof, or any other suitable user behaviors. Example derived user preferences can include: size of outdoor space (e.g., large space for activities with family and/or pet); natural light preference within a property; living room, family room, and/or dining room size for hosting dinner parties; kitchen size and/or cabinet space, and the like. Descriptions with reference to blocks 904, 908, and 910 of FIG. 9 further describe the functionality of user preferences manager 434.

XR system coordinator 436 can coordinate XR system functionality with respect to the user. For example, XR system coordinator 436 can provide instructions to and/or receive information from an XR system that the user wears during in-person visits to properties (e.g., homes for sale, commercial spaces for sale, etc.). XR system coordinator 436 can provide information to property data aggregator 438 and/or metrics generator 440, such as experiential data about the user's experience while located at properties, and other suitable information. In some implementations, XR system coordinator 436 can instruct an XR system to perform a monitoring session, during which the user is monitored in the user's home to derive user preferences for how the user utilizes the user's current home. XR system coordinator 436 can execute at an XR system, remote from the XR system (e.g., at a cloud device, edge device, client device, etc.), any combination thereof, or at any other suitable computing device(s). Descriptions with reference to blocks 802, 804, 806, 808, and 810 of FIG. 8 further describe the functionality of XR system coordinator 436.

Property data aggregator 438 can aggregate data about properties. For example, the user may indicate interest in a set of properties (e.g., homes for sale, commercial spaces for sale, etc.), and property data aggregator 438 can aggregate factual data about these properties, such as address, square footage, number of rooms, number of bathrooms, construction date, school zones, and the like. This factual data can be gathered from property specific databases, Internet sources, property websites (e.g., websites that comprise listings of homes and/or commercial spaces for sale), or any other suitable source of factual data about properties for sale. In some implementations, property data aggregator 438 can receive experiential data from XR system coordinator 436 that is indicative of a user's in-person experience with the properties. In some implementations, metrics generator 440 can provide property data aggregator 438 with user favorability metrics for individual ones of the properties. Descriptions with reference to block 810 of FIG. 8 and blocks 902, 904, 906, 908, and 910 of FIG. 9 further describe the functionality of property data aggregator 438.

Metrics generator 440 can generate user favorability metrics about properties. For example, metrics generator 440 can analyze experiential data (from XR system coordinator 436) and user preferences (from user preferences manager 434) to predict metrics indicative of the user's disposition towards the properties. In some implementations, the experiential data can include natural language spoken by the user while visiting the properties in-person and/or other tracked user behavior (e.g., user gaze, the portion of the property in which the user is located, etc.). Analytical model(s) 444 can analyze the natural language spoken at a particular property to predict a user's disposition towards the property and/or portions of the property, user expected/desired updates or renovations to the property, and the like. Metrics generator 440 can generate metrics related to these predictions, such as an added cost from expected updates or renovations, the user's disposition towards the property, the user's disposition towards individual portions of the property (e.g., kitchen, yard, rooms, etc.), and other suitable favorability metrics. Descriptions with reference to block 908 of FIG. 9 further describe the functionality of metrics generator 440.

Ranking generator 442 can generate a ranking of properties. For example, ranking generator 442 can compare the user's preferences to data from property data aggregator 438 (e.g., property factual data, user favorability metrics generated via metrics generator 440, explicit user feedback about the properties, and the like) to generate an overall ranking of a set properties. The ranking can correlate how well each property complies with user preferences. In some implementations, user preferences can include multiple categories, such as high priority (e.g., must haves) and low priority (e.g., desired) and ranking generator 442 can generate different rankings according to these categories. For example, a first ranking can comprise of properties that comply with all or most of the high priority user preferences, and the individual rankings for each property within the first ranking can be based on compliance with the low priority user preferences. In this example, a second ranking can comprise of properties that comply with a subset of the high priority user preferences (but not all). In some implementations, ranking generator 442 can generate different rankings according to a subset of user preferences (e.g., most cost effective ranking, homes with large kitchens ranking, homes with a yard ranking, commercial spaces above a threshold square footage ranking, etc.). Descriptions with reference to block 910 of FIG. 9 further describe the functionality of ranking generator 442.

Analytical model(s) 444 can include software-based models that analyze, predict, and/or generate information related to properties. Examples of analytical model(s) 444 can be machine learning models, rule-based models, statistical models, and the like. Machine learning models can include neural networks, natural language processing models, computer vision models that process images/video, generative machine learning models, or other suitable machine learning models. Rule-based models can comprise defined rules (e.g., trigger conditions and triggered actions) for analyzing, predicting, and/or generating information. In some implementations, analytical model(s) 444 can comprise multiple stacked models, an ensemble model, or any other suitable architecture comprising multiple models. Descriptions with reference to blocks 802, 804, and 806 of FIG. 8 and block 908 of FIG. 9 further describe the functionality of analytical model(s) 444.

Implementations generate personalized property recommendations based on experiential data obtained via XR systems and machine learning predictions that correlate user preferences to these properties. A user can correspond to one or more persons (e.g., a couple, a family, multiple individuals, etc.) interested in purchasing a property, such as a new standalone home, condominium, townhome, a commercial space, and the like. A property buying workflow often includes defining a set of user preferences for a desired property (e.g., number of rooms, number of bathrooms, location preferences, square footage, price range, etc.) and comparing properties for sale with these defined user preferences. However, in a conventional buying workflow, this comparison is left up to the user and/or the user's real estate agent. Users can often feel overwhelmed by the information, in particular users that do not have previous buying experience. Implementations can integrate machine learning and XR systems into the property buying experience to mitigate the information overload problem and provide meaningful recommendations to the user, such as a ranking of properties that comply with the user's preferences.

Figure 5:
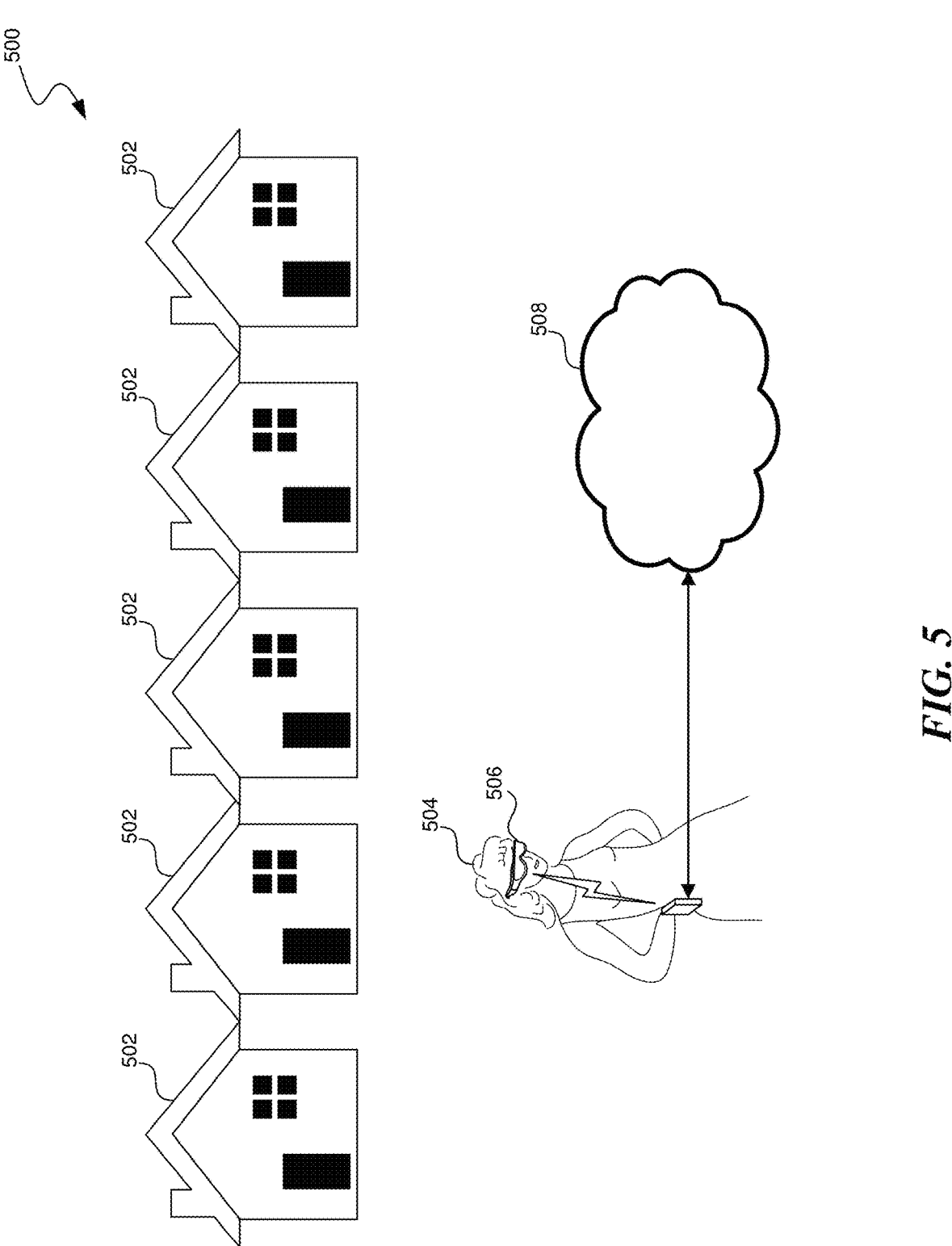
FIG. 5 illustrates a conceptual diagram of properties experienced by a user.

FIG. 5 illustrates a conceptual diagram of properties experienced by a user. Diagram 500 illustrates properties 502, user 504, XR system 506, and property managing system 508. Properties 502 can be single family homes, multi-family homes, commercial spaces, or other suitable properties for sale, such as houses, condominiums, townhouses, duplexes, and the like. In some implementations, a commercial space for sale can correspond to a commercial space available for purchase via ownership or long-term lease. Properties 502 can correspond to a set of properties for sale that user 504 has shortlisted. For example, properties 502 can be listed at any suitable source of homes for sale (e.g., website, databases, etc.) and/or commercial spaces for sale. User 504 can provide a selection of these properties to property managing system 508 (e.g., via property identifier(s), property address, etc.).

Property managing system 508 can be a system that facilitates the user's property buying workflow. For example, property managing system 508 can include components of FIG. 4, such as user preferences manager 434, XR system coordinator 436, property data aggregator 438, metrics generator 440, ranking generator 442, and/or analytical model(s) 444. The user can interact with property managing system 508 via any suitable device(s), such as XR system 506, a smartphone, a laptop, a desktop, a tablet, a smart home device, and the like. One or more applications can display user interface(s) to user 504 that the user can interact with to provide information to property managing system 508 or receive information from this system, such as native applications, web-based applications, or any other suitable applications. Property managing system 508 can be implemented by cloud devices (e.g., servers, databases, virtual machines, etc.), edge devices, client devices, on-premise devices, a combination thereof, or any other suitable computing devices.

In some implementations, user 504 can define user preferences for a desired property, such as a square footage range, number of rooms, number of bathrooms, construction date or age of building, school metric(s) for zoned schools for a residential property, location preferences (e.g., zip code, proximity to landmarks/city or highways, coordinates that define a geographic region, etc.), a desired floorplan (e.g., multi-floor, single story, basement, room size, kitchen size, etc.), and the like. For example, the user can provide these defined user preferences to property managing system 508.

In some implementations, property managing system 508 can derive a set of user preferences based on the factual data of properties 502. Because user 504 shortlisted these properties, their characteristics can be indicative of the user's desired home. Factual data about properties 502 can include data publicly available for residential or commercial properties listed for sale, such as square footage, number of rooms, number of bathrooms, construction date, monthly fees (e.g., homeowner's association fees, building fees, etc.), floorplan information, zip code, zoned schools for residential properties, and the like. Property managing system 508 can aggregate this factual data using identifiers for properties 502 (e.g., address, database identifiers, etc.) from any suitable sources (e.g., Multiple Listing Service (MLS) database or other similar database(s), website listings, etc.). Examples of derived user preferences can include a square footage range, a number of bedrooms/bathrooms, location preferences, a home age, a desired floorplan (e.g., multi-floor, single story, basement, etc.), and other suitable home characteristics consistent with properties 502.

In some implementations, analytical model(s) can be configured/trained to correlate the factual data of properties 502 to derive a set of user preferences that is consistent with this factual data. For example, the square footage values of these properties can be bucketed into a square footage range, the number of rooms and/or bathrooms can be similarly bucketed into range(s), and the like. In some implementations, computer vision model(s) can be trained to analyze floorplans and predict metrics for these properties, such as room square footage, kitchen square footage, multi-floor or single story, whether the property includes a basement, and the like. These predicted metrics can similarly be analyzed to derive user preferences for room size, kitchen size, and other suitable floorplan preferences.

User 504 can interact with XR system 506 to generate experiential data about properties 502. For example, user 504 can visit properties in-person while wearing XR system 506. XR system 506 can track the user during the experience, such as record spoken language from the user, track the user's eyes, and the like. XR system 506 can generate experiential data while the user experiences properties 502, such as natural language spoken by the user while visiting the properties, portion(s) of the properties targeted by the user's natural language and/or the user's tracked eyes, and the like. In some implementations, XR system 506 and/or additional devices (not depicted), such as a user smartphone or wearable device, can detect biometric information from the user while the user experiences properties 502, such as pupil dilation, heart rate, body temperature, and the like. This experiential data can be analyzed by analytical model(s) to generate recommendations for user 504, such as a ranking of properties 502 that is consistent with the user's preferences for a desired home.

Figure 6A:
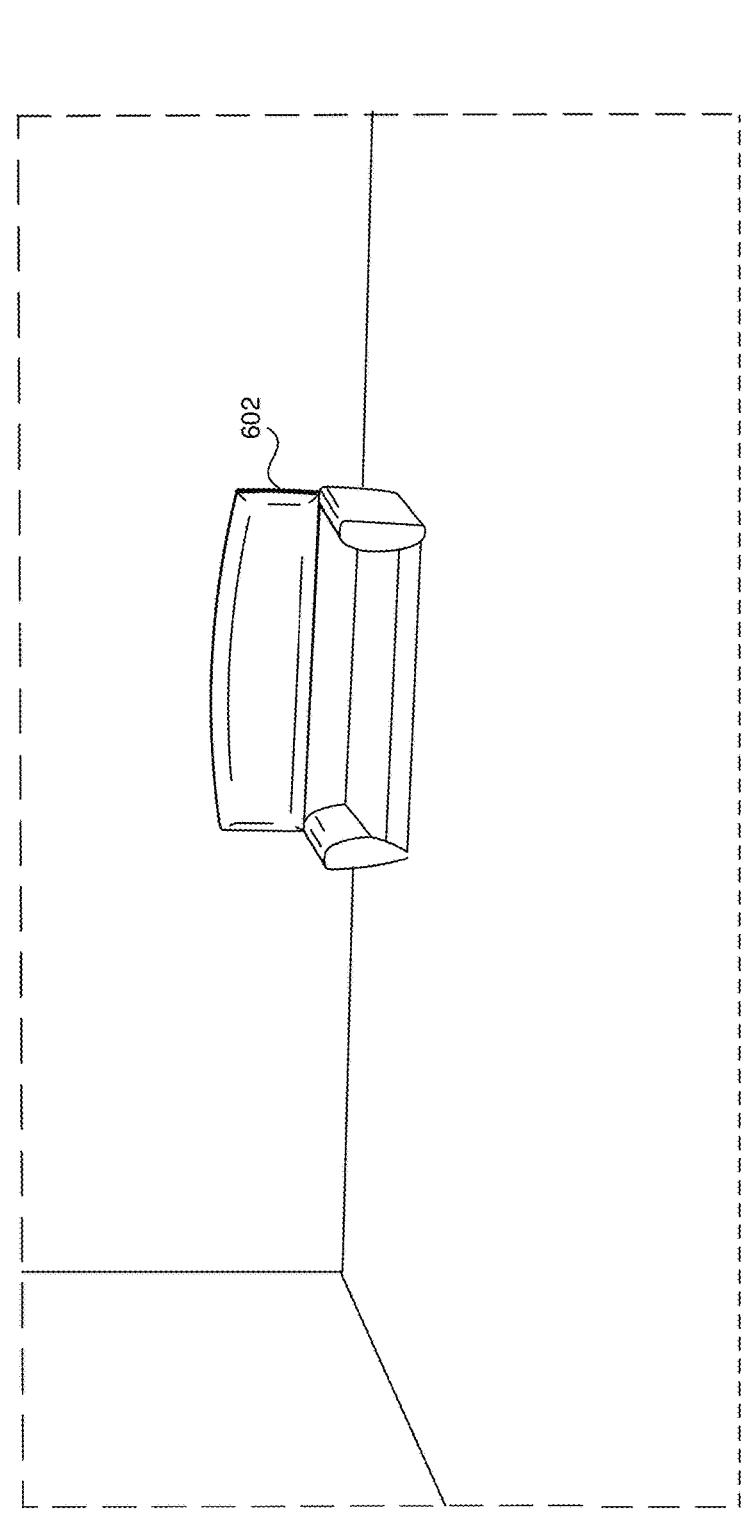
FIG. 6A illustrates a conceptual diagram of an artificial reality user experience of a property.

FIG. 6A illustrates a conceptual diagram of an artificial reality user experience of a property. For example, XR environment 600A can be displayed to user 504 via XR system 506 while visiting one of properties 502. As the user walks through the property, the XR system can sense audio from the user (e.g., spoken language from the user), sense audio from others at the property, such as the user's partner, a real estate agent, etc., track the user's eyes, and perform any other suitable user tracking. In some implementations, the XR system can comprise a floorplan and/or blueprint of the property and track which portion of the property that the user is located at any given time.

The spoken language from the user while experiencing the property can indicate the user's disposition towards the property and/or parts of the property (e.g., 'I like that chandelier', 'this is a big kitchen', 'these bedrooms are a bit small', etc.). In some implementations, when the XR system senses spoken language from the user, the spoken language can be associated with a target that the user is looking towards. For example, analytical model(s) can resolve a target of the user's gaze based on the user's tracked eyes and associate the spoken language to the resolved target. When analyzing spoken language such as "I really like this" or "we are going to have to replace this whole part", the resolved target can provide context so that analytical model(s) to determine what portion(s) of the property the user is speaking about. In some implementations, analytical model(s) can derive the target of the spoken language from the language itself (e.g., 'this is a big kitchen' indicates the user likes the size of the kitchen and that the kitchen is big).

In some implementations, the XR system can record the user's experience at a property, such as XR environment 600A displayed to the user while the user conducts the walkthrough, the sound recorded via microphones, and the like. The recorded experience can be stored (e.g., by property managing system 508 of FIG. 5) and configured for playback. For example, the recorded experience can be played back via the XR system so that the user can be immersed within a three-dimensional XR environment. In another example, the recorded experience can be streamed as a video to a device comprising a two-dimensional display (e.g., smartphone, desktop, laptop, tablet, television screen, etc.). For example, the user can share the experience with others that are not physically able to tour the property, such as family members or prospective buyers. In this example, prior to submitting an offer on a property for sale, the user may want to go through the experience again to verify the user's interest in the property and/or solicit feedback from others.

In some implementations, the XR system can provide visual aids that enhance the user's experience while conducting the walkthrough of the property. For example, XR environment 600A includes furniture 602 physically located in a room. The user may find it beneficial to visualize the furniture the user already owns within the room. For example, the XR system can generate an XR environment (e.g., VR environment, AR or MR environment, etc.) that includes virtual objects that visually correspond to the user's existing furniture.

Figure 6B:
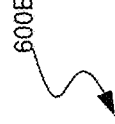
FIG. 6B illustrates a conceptual diagram of an artificial reality user experience comprising virtual objects.
Figure 6B:
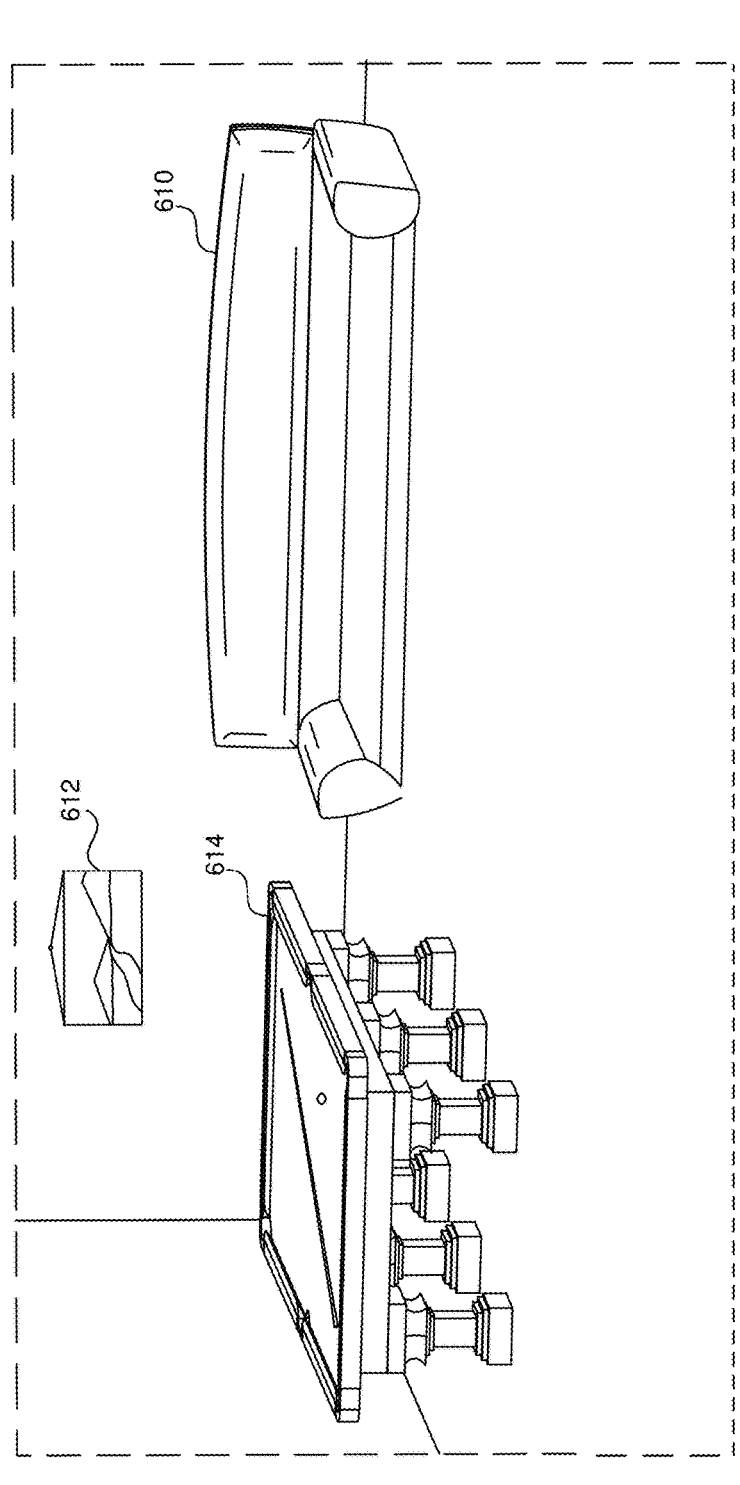

FIG. 6B illustrates a conceptual diagram of an artificial reality user experience comprising virtual objects. XR environment 600B includes virtual objects 610, 612, and 614. For example, virtual objects 610, 612, and 614 can correspond to the user's furniture and artwork. In some implementations, the user can scan the user's belongings such that the XR system stores representations of the user's belongings. Scanning a piece of furniture can include capturing the furniture from different perspectives and/or following a guided workflow to scan the furniture. In some implementations, the stored representation of the furniture can comprise structural information (e.g., a three-dimensional mesh) and visual data (e.g., skin and/or texture for the three-dimensional mesh). An XR system can utilize this stored representation to generate a virtual object that resembles the scanned piece of furniture. XR environment 600B can enable the user to visualize how the user's furniture would look with the room of the property (e.g., home the user is touring). In some implementations, the user can interact with XR environment 600B and virtual objects 610, 612, and 614 to place the objects at different locations in the room.

In some implementations, the XR system can also support other visual aids for the user. For example, the user can target a wall of the property and alter the color of the targeted wall via an instruction, such as targeting a wall via the user's gaze and saying 'change the color of this wall to blue'. The XR system can perform an object recognition workflow (e.g., using one or more computer vision models) to identify the boundaries of the wall and paint the wall the instructed color using an overlaid virtual object (e.g., semi-transparent virtual object), virtual filter, or any other suitable visual element. In some implementations, the user can target other objects, such as cabinets, counter tops, and the like and instruct the XR system to superimpose virtual objects, filters, or other virtual elements over these objects to alter their appearance.

In some implementations, the XR system can simulate lighting conditions within the property. For example, based on known orientation of the property and window positions within rooms, an amount of natural light provided by the windows can be estimated for different times of day. The XR system can generate an XR environment (e.g., VR environment, AR or MR environment, etc.) that simulates lighting conditions in a given room of the property according to the light that enters the room via the windows of the property.

In some implementations, the XR system can simulate updates and/or renovations via a displayed XR environment. For example, the XR system can generate a VR environment in accordance with the dimensions of two rooms in the property. The user may instruct the XR system to remove a wall that separates the two rooms such that the rooms become a single room. The user can then visualize the size of the single room. In some implementations, the user can place virtual objects that resemble the user's furniture in the VR room. In another example, the XR system can superimpose a virtual object on top of a real-world portion of the property to simulate an update or renovation. For example, the user can instruct the XR system to simulate granite countertops in a kitchen, and the XR system can generate a virtual skin (e.g., texture) atop the countertops in the kitchen in accordance with the dimensions of the countertops to simulate granite countertops. In another example, the XR system can simulate tile on the wall of the kitchen via virtual objects to simulate a backsplash in the kitchen in response to user instruction.

In some implementations, the XR system can be used to render a visualization of a new home or commercial space. For example, the blueprints and/or floor plan of a home or commercial space can be provided to the XR system, and a structure comprising empty rooms can be generated in VR. The orientation of the structure and window positions of the rooms can be used to estimate lighting conditions within the rooms of the structure. In some implementations, windows can be placed in new locations via user interactions with the XR system, and the lighting conditions can be updated based on the new window placements. Accordingly, a user can generate a design that meets aesthetic and lighting preferences.

In some implementations, user interactions via the XR system can include any suitable interaction techniques in VR, AR, and/or MR. For example, the user can manipulate hand-held controllers that provide targeting input, selection input, scrolling, and other forms of user input. The XR system can track user motion and implement ray projection based on tracked user hand, wrist, and/or arm movement. The XR system can track user eye movement, resolve the user's gaze, and/or detect eye gestures (e.g., blinking) to receive various forms of user input. In some implementations, user gestures such as pinching, pointing, back and forth hand movement, or other gestures can correspond to various forms of user input. The XR system can also receive instructions via audio commands from the user.

Returning to FIG. 5, user 504 can experience properties 502 via XR system 504 such that experiential data is captured for each of the properties. In some implementations, analytical model(s) can analyze the experiential data for the properties and generate one or more user favorability metrics related to the properties. Examples of user favorability metrics for a property can include: an estimated cost for purchasing and/or updating the property, the user's disposition towards portions of the property (e.g., kitchen, master bedroom, outdoor space, living area, conference rooms, etc.), the user's disposition towards the property location, the user's disposition on the property floorplan (e.g., room sizes, basement, layout, etc.), the user's disposition on the natural light within the property, and other suitable favorability metrics.

For example, natural language spoken by user 504 can be captured as part of the experiential data. In some implementations, a target for the natural language can be resolved, such as a portion of the property targeted by the user's gaze when user 504 speaks and/or a target resolved from the natural language itself. The target can be stored in association with the natural language as part of the experiential data, and/or the target can be resolved based on analysis of the experiential data. In some implementations, the user's location within the property (e.g., the room the user is located in) can be tracked and recorded as part of the experiential data. One or more natural language processing models can understand the user's spoken language with respect to the resolved target for the spoken natural language.

For example, user 504 can say 'I like these rooms, they are big, and have you seen the closets' and the natural language processing models can analyze this spoken natural language to derive that: the user has a favorable disposition towards the floorplan, the user has a favorable disposition towards the size of the bedrooms, and the user has a favorable disposition towards the closet space. In another example, user 504 can say 'Oh, this space is a little cramped, and doesn't get much natural light' when located in the basement of the property. The natural language processing models can analyze this spoken natural language in combination with a target for the language (e.g., resolved via the user's location and/or the user's gaze) to derive that: the user has an unfavorable disposition towards the floorplan, the user has an unfavorable disposition towards the size of the basement, and the user has an unfavorable disposition towards the lighting in the basement.

When these two examples are taken in combination, the user's disposition towards the property's floorplan is mixed. In particular, the user likes the bedrooms but dislikes the basement. Analytical model(s) can aggregate different user dispositions towards the floorplan to generate a favorability metric descriptive of the user's overall disposition towards the floorplan. For example, the favorability metric can be a numeric value within a range (e.g., between 1 and 5, between 1 and 10, etc.) and a mixed disposition can correspond to a middle value in the range, a negative disposition can correspond to a low value in the range, and a positive disposition can correspond to a high value in the range. The analytical model(s) can generate any other suitable favorability metric in implementations.

In some implementations, the generated favorability metrics can relate to updates and/or renovations that user 504 plans to perform if the property is purchased. For example, user 504 may say 'these cabinets have got to go' and the natural language processing models can analyze this spoken language to derive that: the user has an unfavorable disposition towards the kitchen cabinets, and the user plans to update the kitchen cabinets. In another example, user 504 may say 'this is a total rebuild' when located in the kitchen and the natural language processing models can analyze this spoken language to derive that: the user has an unfavorable disposition towards the kitchen, and the user plans to renovate the entire kitchen.

Analytical model(s) can further estimate a cost for performing a predicted update or renovation. For example, each update or renovation predicted for a given property can correspond to a predicted property specific parameter. The predicted property specific parameter can include descriptive language with respect to the renovation, such as "entire kitchen remodel", "new cabinets", "new appliances" or other suitable language that indicates a scope of the update or renovation. Factual data about the given property can indicate the property's location, such as the address. The analytical model(s) can aggregate cost information associated with the renovation that corresponds to the predicted property specific parameter. The aggregated cost information can comprise historical renovation costs proximate to or at the location of the given property. In some implementations, the cost can be aggregated from databases that store information about historical renovation projects and their costs, web sources (e.g., websites) that estimate a cost for the renovation, or any other suitable source. Analytical models can analyze the cost information to generate an estimated cost range for the renovation.

In some implementations, a cost database can be maintained (e.g., by property managing system 508) that stores common property updates/renovations and costs associated with the renovations with respect to different location categories. For example, a given type of renovation (e.g., kitchen renovation) can be broken into categories (e.g., full renovation, partial renovation, light update). In addition, property locations can be categorized into cost groups (e.g., high cost, medium cost, low cost). For a given property specific parameter, analytical model(s) can match the predicted renovation/update to a type of renovation and renovation category, such as: kitchen: 'full renovation' for a full kitchen remodel; kitchen: 'light update' for upgrading kitchen appliances; kitchen: 'partial renovation' for updating kitchen cabinets; and the like. In addition, the location of the property that corresponds to the property specific parameters can be matched to a cost group, such as based on the cost of living associated with the zip code, city, census tract, etc. Using the renovation type, renovation category, and cost group, analytical model(s) can look up a cost range for the update/renovation via the cost database. In some implementations, the cost database can be maintained based on user feedback (e.g., receiving actual cost information for updates or renovations), aggregated data from Internet or other sources (e.g., websites, databases, etc.), surveys of professionals that perform the updates/renovations, or any other suitable maintenance techniques.

In some implementations, at least one user favorability metric generated by analytical model(s) for a given property can be an estimated cost for predicted updates and/or renovations. For example, the estimated cost range for each predicted update and/or renovation can be aggregated to estimate an overall cost range for the user favorability metric. Any other suitable technique can be used to generate a user favorability metric that corresponds to an estimated cost for predicated updates/renovations. In some implementations, analytical model(s) can analyze experiential data captured for one or more of residential properties 502 to derive additional user preferences. Descriptions with respect to FIG. 7 further describe user preferences derived from experiential data.

In some implementations, property managing system 508 can rank properties visited by user 504 using the set of user preferences, generated user favorability metrics, and factual data about the properties. For example, the user visits to the properties can be walkthroughs of homes or commercial spaces for sale, and XR system 506 can generate experiential data for each property. The experiential data can be analyzed by analytical model(s) to generate user favorability metrics with respect to each property. A ranking generator at property managing system 508 can rank these properties by comparing the factual data about the properties and the user favorability metrics to the user preferences.

Example user preferences can include a square footage range, number of rooms range, number of bathrooms range, location preferences (e.g., zip code, cities, coordinates that define one or more geographic regions, etc.), overall cost for purchasing the property, kitchen quality (e.g., large kitchen, modern kitchen, etc.), floorplan preference (e.g., include a basement, etc.), and the like. Property managing system 508 can compare the factual data about the properties to first user preferences that relate to the factual data, such as square footage, number of bedrooms range, number of bathrooms range, location preference, and the like. A subset of the set of properties can include factual data that meets these user preferences (e.g., falls within the user preference numeric ranges, geographic locations, etc.).

Next, property managing system 508 can compare the user favorability metrics generated for properties (e.g., generated via analysis of the experiential data for the residential properties) to second user preferences. For example, second user preferences related to the floorplan (e.g., includes a basement, big bedrooms, etc.), the kitchen quality (e.g., size, aesthetic, etc.), and other user preferences related to the user's subjective point of view can be compared to the user favorability metrics. In this example, the user favorability metrics are likely to include some elements of the user's subjective point of view, and thus comparing the second user preferences to these metrics is more likely to generate a ranking that is consistent with the user's perspective.

In an example, user favorability metrics for a given property related to the basement can be: the user has an unfavorable disposition towards the size of the basement, and the user has an unfavorable disposition towards the lighting conditions in the basement. When these example favorability metrics are compared to a user preference for a basement or a large basement, the comparison can indicate that the given property does not meet this user preference. In another example, user favorability metrics for the given property related to the basement can be: the user has an favorable disposition towards the size of the basement. When this example user favorability metric is compared to a user preference for a basement or a large basement, the comparison can indicate that the given property meets this user preference.

In another example, user favorability metrics for a given property related to the kitchen can be: the user has an unfavorable disposition towards the kitchen, and the user plans to renovate the entire kitchen. In some implementations, comparisons between favorability metrics and user preferences can be dynamically configured in response to a user selection with respect to considering updates and/or renovations. For example, a first version of the property ranking can be generated that anticipates the completion of predicted updates and/or renovations, and a second version of the property ranking can be generated that does not consider predicted updates and/or renovations. In the first version of the ranking, the comparison between these favorability metrics and user preferences for a large and modern kitchen can indicate that the given property meets the user preferences because anticipated updates and/or renovations will be completed. In this second version of the ranking, the comparison between these favorability metrics and user preferences for a large and modern kitchen can indicate that the given property does not meet the user preferences because the user has an unfavorable disposition towards the existing kitchen.

In some implementations, user preferences related to an overall cost can be compared to both factual data about the properties and user favorability metrics. For example, some user favorability metrics can include predicted updates and/ or renovations for a given property and an estimated cost for completing the updates and/or renovations. When a ranking is configured to include predicted updates and/or renovations, these estimated costs can be added to a cost from the factual data for purchasing the property (e.g., list price, expected sale price due to market conditions, etc.). The sum of the cost from the factual data and the estimated costs can be compared to the overall cost from the user preferences to determine whether the property meets the cost preference (e.g., is within a cost range, below a maximum cost, etc.). In another example, a ranking can be configured to exclude predicted updates and/or renovations. In this example, the cost from the factual data (without the additions of the estimated costs for the predicted renovations/updates) can be compared to the overall cost from the user preferences to determine whether the property meets the cost preference.

The generated ranking can rank properties according to met user preferences. For example, the ranking can be based on a percentage of user preferences met (e.g., higher percentage indicates a higher ranking). In some implementations, a property ranking can be based on comparing the factual information and/or user favorability metrics for the properties to a selected set of user preferences. For example, the user can select a subset of the user preferences and generate a ranking using the subset. The user can select different ones of the user preferences and generate different rankings according to the different selections.

In some implementations, user preferences can be grouped according to priority levels. User preferences in the first priority level can have a larger impact on the ranking than user preferences in the second priority level. The priority level groupings can be user selected and/or predefined. For example, square footage, overall cost, and kitchen preferences (e.g., large and modern kitchen) can be in a first priority group while number of rooms, location, and basement preferences can be in a second priority group. Three example properties may meet different user preferences: a first property may meet all three of the user preferences in the first priority group and one of the user preferences in the second priority group; a second property may meet all three of the user preferences in the first priority group user and two of the user preferences in the second priority group; and a third property may meet two of the user preferences in the first priority group and three of the user preferences in the second priority group.

In this example, the first and second properties rank above the third property because the first and second properties meet all of the user preferences from the first priority group. The third property meets a higher number of user preferences (e.g., five total) than the first property (e.g., four total), but the higher number of met user preferences from the first priority group means that the first property ranks above the third property. Further, in this example the second property ranks above the first property because both properties meet all three user preferences from the first priority group, but the second property meets a higher number of user preferences from the second priority group than the first property. Any other suitable ranking techniques can be used to rank properties according to met user preferences.

Figure 7:
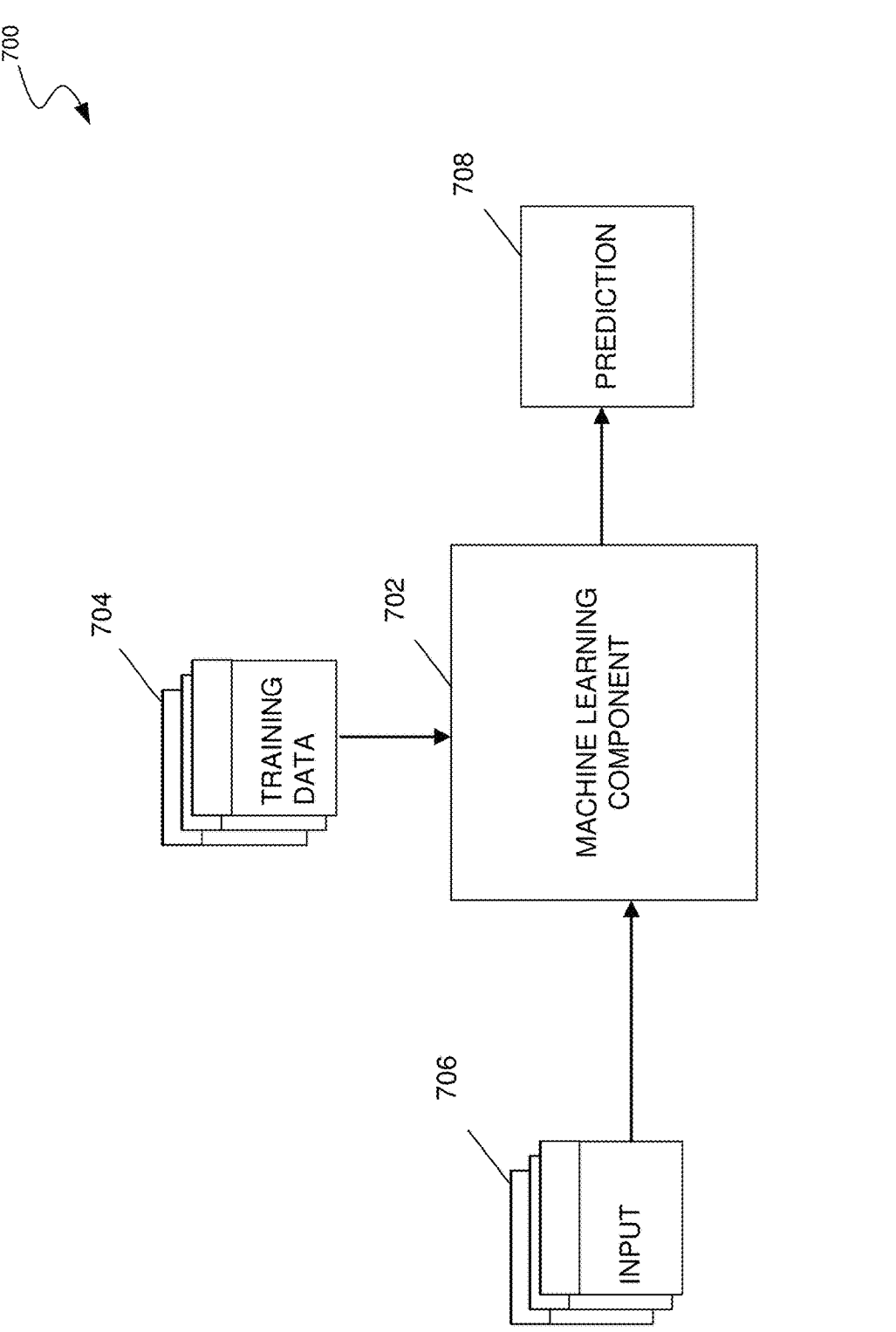
FIG. 7 is a system diagram illustrating components of a machine learning system.

FIG. 7 is a system diagram illustrating components of a machine learning system. System 700 includes machine learning component 702, training data 704, input data 706, and prediction 708. Machine learning component 702 can be a designed model that includes one or more machine learning elements (e.g., neural network, support vector machine, Bayesian network, random forest classifier, gradient boosting classifier, and the like). Training data 704 can be any set of data capable of training machine learning component 702 (e.g., a set of features with corresponding labels, such as labeled data for supervised learning). Training data 704 can be used to train machine learning component 702 to generate a trained machine learning model. For example, any suitable training technique (e.g., supervised training via gradient descent, unsupervised training, etc.) can be used to update the configuration of machine learning component 702 (e.g., train the weights of a machine learning model) using training data 704.

Analytical model(s) 444 of FIG. 4 can include machine learning component 702 of FIG. 7. For example, a trained machine learning model may be configured to predict, using experimental data obtained at a property via an XR system: user preferences, property specific parameters (e.g., user desired update or renovation, user disposition towards portions of the property, etc.), user favorability metrics, and the like. Predictions 708 can be generated using input 706, which includes features of the experimental data obtained at a property via an XR system, factual data about a given property, user preferences, and/or other suitable data. Accordingly, in some implementations prediction 708 generated by machine learning component 702 trained by versions of training data 704 can be predicted user preferences, predicated property specific parameters (e.g., predicted renovations to a property, predicted user disposition towards a part of the property, such as the kitchen, floorplan, master bedroom, etc., and other suitable property specific parameters), predicted user favorability metrics, and the like.

The design of machine learning component 702 can include any suitable machine learning model components (e.g., a neural network, support vector machine, specialized regression model, random forest classifier, gradient boosting classifier, and the like). For example, a neural network can be implemented along with a given cost function (e.g., for training/gradient calculation). The neural network can include any number of hidden layers (e.g., 0, 1, 2, 3, or many more), and can include feed forward neural networks, recurrent neural networks, convolution neural networks, transformer networks, encoder-decoder architectures, and any other suitable type. In some implementations, the neural network can be configured for deep learning, for example based on the number of hidden layers implemented. In some examples, a Bayesian network can be similarly implemented, or other types of supervised learning models.

For example, a support vector machine can be implemented, in some instances along with one or more kernels (e.g., gaussian kernel, linear kernel, and the like). In some implementations, a k-nearest neighbor ("KNN") algorithm can be implemented. For example, a KNN algorithm can determine a distance between input features (e.g., features for a new transaction, represented by input 706) and historic training data instances (e.g., training data instances of transactions with labels). One or more "nearest neighbors" relative to this distance can be determined (the number of neighbors can be based on a value selected for K). In some implementations, the determined nearest neighbors can have features similar to the input features. Prediction 708 can then be generated based on the distances from these "nearest neighbor" instances.

In some implementations, machine learning component 702 can include an ensemble learning model. For example, machine learning component 702 can include a random forest classifier that includes multiple machine learning components whose predictions are combined. Implementations of the random forest classifier include decision trees that are trained by training data 704 (e.g., using subsets of the training data per tree). The random forest algorithm can then aggregate votes from these decision trees to arrive at a prediction.

Machine learning component 702 can be multiple models stacked, for example with the output of a first model feeding into the input of a second model. Some implementations can include a number of layers of prediction models. Features utilized by machine learning component 702 can also be determined. For example, feature engineering can be used to generate a set of features implemented by one or more machine learning models.

In some implementations, the design of machine learning component 702 can be tuned during training, retraining, and/or updated training. For example, tuning can include adjusting a number of hidden layers in a neural network, adjusting a kernel calculation used to implement a support vector machine, and the like. This tuning can also include adjusting/selecting features used by the machine learning model. Various tuning configurations (e.g., different versions of the machine learning model and features) can be implemented while training in order to arrive at a configuration for machine learning component 702 that, when trained, achieves desired performance (e.g., performs predictions at a desired level of accuracy, run according to desired resource utilization/time metrics, and the like). Retraining and updating the training of machine learning component 702 can include training the model with updated training data. For example, the training data can be updated to incorporate observed data, or data that has otherwise been labeled (e.g., for use with supervised learning).

In some implementations, machine learning component 702 can include an unsupervised learning component. For example, one or more clustering algorithms, such as hierarchical clustering, k-means clustering, and the like, or unsupervised neural networks, such as an unsupervised autoencoder, can be implemented. For example, historical data that includes factual data about sets of properties shortlisted by users can be analyzed to determine property features that correspond to user data features. In another example, historical data that includes user preferences and corresponding experiential data obtained via an XR system while a user experiences a property can be analyzed to determine user preference features that correspond to experiential data features.

In some implementations, machine learning component 702 can include one or more machine learning models trained via a set of training data 704 to predict property specific parameters based on user experiential data. For example, user experiential data can be user data tracked via an XR system while a user experiences a property (e.g., during a walkthrough of a home for sale). The tracked user data can include natural language spoken by the user, eye tracking, biometric tracking, and the like. Training data 704 can train machine learning component 702 to analyze the user's spoken language to predict a user disposition related to the property, predict a portion of the property the user intends to target with the user's spoken language (e.g., kitchen, floorplan, master bedroom, conference room, etc.), predict an alteration to the property, and the like.

In some implementations, a first model of machine learning component 702 can be trained to predict a target of the user's gaze (e.g., based on the tracked user's eyes) and a second model of machine learning component 702 can be trained to predict a property specific parameter about the predicted target. For example, the user may speak the words "this will need to be replaced, or at the least updated" while looking towards a portion of the property. The first model can predict a target (e.g., the kitchen cabinets) based on the user's gaze while the user speaks these words, and the second model can predict the property specific parameter correlated to the target (e.g., kitchen renovation).

In some implementations, machine learning component 702 can be trained to predict a user's overall disposition about a property using a stored recording of the user's spoken language while experiencing the property. In some implementations, machine learning component 702 can be trained to predict a user's disposition about specific portions of the property (e.g., floorplan, kitchen, bathrooms, master bathroom, outdoor space, etc.) using a recording of the user's spoken language while experiencing the property.

In some implementations, machine learning component 702 can be trained to predict user preferences using stored recordings of the user's spoken language while experiencing multiple properties. User defined preferences may not capture all of the user's desired preferences. For example, machine learning component 702 can analyze the language spoken by a user to predict that an outdoor space available at a property is important to the user. This prediction can be compared to the user's defined preferences, and, when it is not listed, the predicted user preference can be suggested as a derived user preference.

In some implementations, machine learning component 702 can analyze natural language spoken by the user (across different properties) with respect to a specific property attribute (e.g., outdoor space, basement, etc.) to determine features about the speech, such as a number of times the property attribute is mentioned, the user's general disposition towards the property attribute, the user's tone of voice when discussing the property attribute, and the like. In some implementations, these determined features can be compared to a user preference criteria, and when the determined features meet the user preference criteria a suggested user preference can be derived from the user's speech. For example, machine learning component 702 can be trained to predict the user's preference with respect to the property attribute using the instances of speech where the user mentions the property attribute (e.g., user prefers a large outdoor space, user prefers an outdoor space to entertain company, user prefers an outdoor space for pets, etc.).

In some implementations, the derived user preference can be suggested to the user for inclusion in the set of user preferences used to generate user favorability metrics and/or rank properties. For example, the derived user preference can be displayed to the user via a user system and the user can accept or reject the derived user preference via the user system. In some implementations, when a derived user preference is accepted by a user, a previous property ranking can be regenerated based on the newly added derived user preference.

In some implementations, machine learning model(s) and rule-based models can be combined to generate property predictions, metrics, and/or analytics. For example, model(s) of machine learning component 702 can be implemented in combination with various rule-based models, predefined mappings, other statistical models, and other suitable analytical model(s).

In some implementations, analytical model(s) can estimate practical uses for a property. For example, some properties may be located in a property zone that permits certain forms of use, such as commercial use for some portions of the property, renting portions of the property, and the like. Analytical model(s) can compare the property to similar properties and known uses for these similar properties to estimate parameters related to these uses. For example, analytical model(s) can estimate a daily, weekly, or monthly rent associated with renting the property (or room(s) of the property) over a short period of time. The analytical model(s) can also predict users for undeveloped land that is part of the property, such as land usable for grazing and other suitable farming or ranching applications.

Those skilled in the art will appreciate that the components illustrated in FIGS. 1-7 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 8:
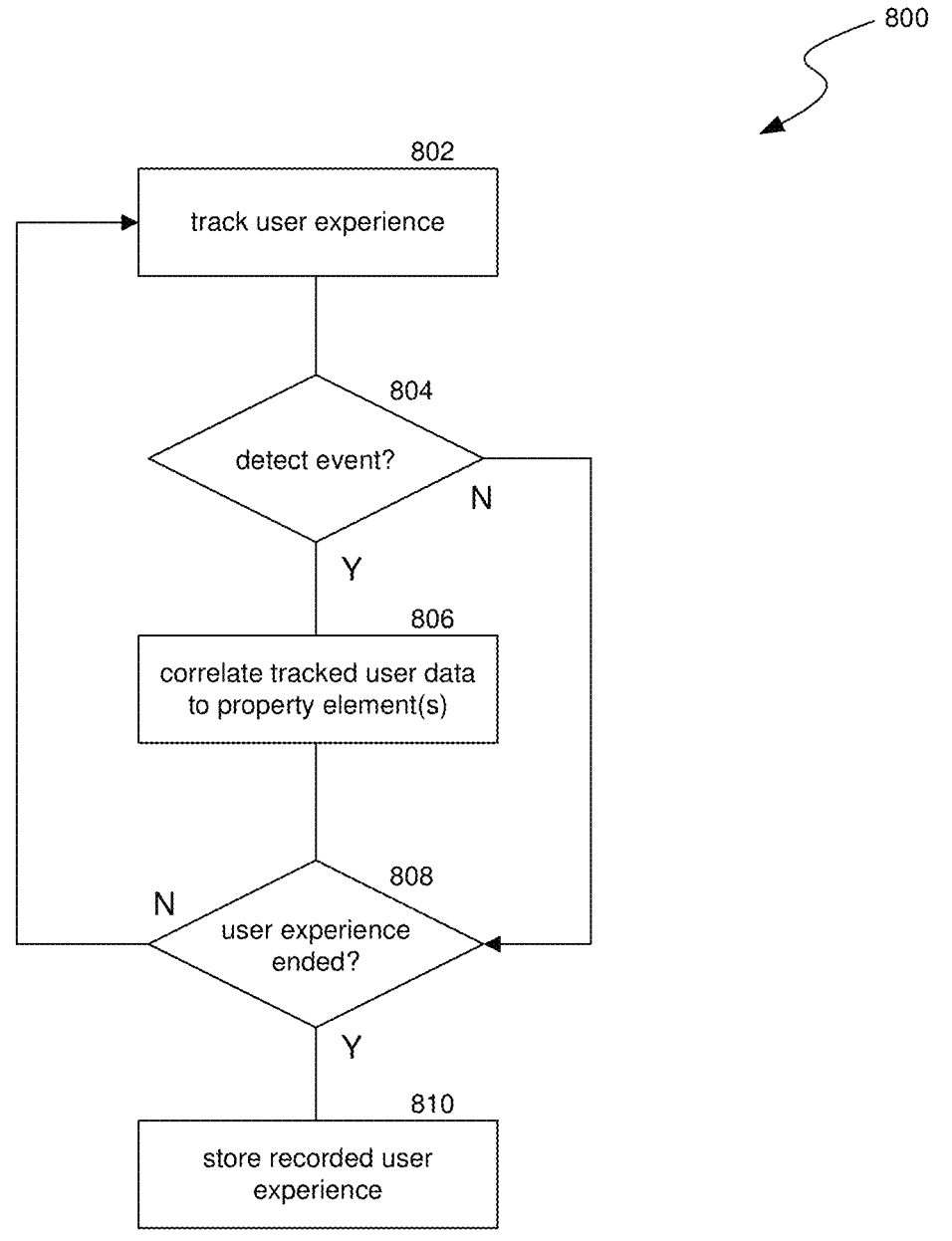
FIG. 8 is a flow diagram illustrating a process used in some implementations of the present technology for obtaining experiential data for properties.

FIG. 8 is a flow diagram illustrating a process used in some implementations of the present technology for obtaining experiential data for properties. In some implementations, process 800 can be triggered when a user initiates an experience at a property. Process 800 can be implemented by an XR system and/or a combination of an XR system, cloud system, edge system, client system, any combination thereof, or any other suitable computing system(s).

At block 802, process 800 can track the user's experience at the property. For example, an XR system can track a user while the user experiences a property in-person (e.g., performs a walkthrough of a home for sale). As the user walks through the property, the XR system can sense audio from the user (e.g., spoken language from the user), sense audio from others at the property, such as the user's partner, a real estate agent, etc., track the user's eyes, and perform any other suitable user tracking. In some implementations, the XR system can comprise a floorplan and/or blueprint of the property and track which portion of the property that the user is located at any given time. The XR system and/or one or more other systems (e.g., wearable device, such as a smart watch, etc.) can track the user's biometric information. For example, the tracked biometric information can include pupil dilation, heart rate, body temperature, and the like.

At block 804, process 800 can determine whether an event is detected. Example events can include the user (or others) speaking, the user's tracked biometric information meeting an event criteria (e.g., spike in heart rate, pupil dilation, etc.), or other suitable events. In some implementations, an event can be detected when natural language speech is detected. In another example, an event can be detected when the tracked user biometric information meets a criteria, such as a change in heart rate that is greater than threshold, a pupil size that is greater than a threshold, and the like. When an event is detected, process 800 can progress to block 806. When an event is not detected, process 800 can progress to block 808.

At block 806, process 800 can correlate tracked user data to element(s) of the property. For example, detected speech can be correlated to part(s) of the property targeted by the user's gaze, locations in the property in which the user is located when speaking, and the like. In another example, a detected user biometric change can be correlated to part(s) of the property targeted by the user's gaze, locations in the property in which the user is located when the biometric change is detected, and the like. The correlation can be used to tag experiential data obtained during the user's in-person experience with targeted portions of the property.

At block 808, process 800 can determine whether the user experience has met a termination criteria. Example termination criteria can include receiving user input that indicates the experience (e.g., in-person walkthrough of the property) has terminated, detecting that the XR system has left the location of the property, detecting that the user has stopped operating (e.g., removed) the XR system, or any other suitable termination criteria. When the user experience has reached a termination criteria, process 800 can progress to block 810. When the user experience has not reached a termination criteria, process 800 can loop back to block 802 and continue to track the user experience until the user experience has met the termination criteria at block 808.

At block 810, process 800 can store the recorded user experience. For example, the XR environment displayed to the user during the user experience can be recorded and stored. Audio sensed during the user experience (e.g., natural language spoken by the user and/or others) can similarly be recorded and stored. In some implementations, the stored user experience can be configured for playback. For example, the user can playback the user experience via the XR system (e.g., XR environment visual and recorded audio) to experience an immersive playback. In another example, the recorded and stored experience can be streamed to other individuals and/or devices for playback, such as via a two-dimensional display. For example, the recorded and stored experience can be configured for playback as a two-dimensional video and audio.

In some implementations, the XR system can record physical walkthroughs of properties (e.g., homes for sale, commercial spaces for sale, etc.), where the recorded walkthroughs comprise: a) video of the physical walkthroughs from the user's perspective, and b) sound recorded during the physical walkthroughs. The recorded walkthroughs can be stored at a cloud system, at the XR system, or at any other suitable computing device. In some implementations, the recorded walkthroughs are configured for streaming and playback as: 1) two-dimensional video; and/or 2) immersive three-dimensional video.

Figure 9:
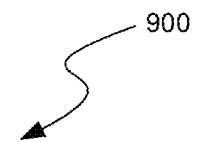
FIG. 9 is a flow diagram illustrating a process used in some implementations of the present technology for generating personalized property recommendations using machine learning and artificial reality.
Figure 9:
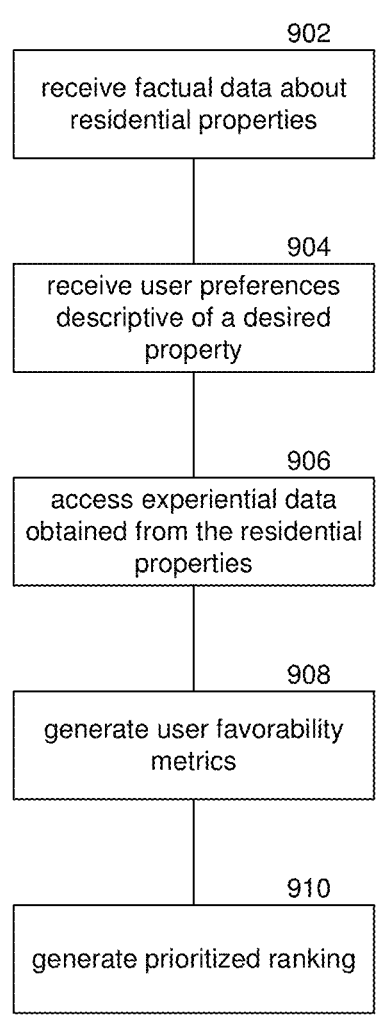

FIG. 9 is a flow diagram illustrating a process used in some implementations of the present technology for generating personalized property recommendations using machine learning and artificial reality. In some implementations, process 900 can be triggered after experiential data is obtained from a set of properties. For example, process 800 of FIG. 8 can be implemented to obtain experiential data from these properties. Process 900 can be implemented by an XR system, cloud system, edge system, client system, any combination thereof, or any other suitable computing system(s).

At block 902, process 900 can receive factual data about properties. For example, the properties can be homes for sale (e.g., standalone homes, townhomes, condominiums, etc.) and/or commercial spaces for sale that a user has shortlisted. In some implementations, the factual data about the properties can include information about a physical home structure, such as an age of the structure (e.g., construction date), number of bedrooms, number of bathrooms, square footage, school zone information, homeowner's association fees, address and/or other location information, ownership type (e.g., fee simple, condominium, etc.), city and/or county information, and any other suitable factual data about homes for sale.

At block 904, process 9800 can receive user preferences descriptive of a desired property. Example user preferences include a square footage range, number of bedrooms, number of bathrooms, construction date or age of home, school metric(s) for zoned schools, location preferences (e.g., zip code, proximity to landmarks/city, coordinates that define a geographic region, etc.), a desired floorplan (e.g., multi-floor, single story, basement, master bedroom size, kitchen size, etc.), and the like. In some implementations, user preferences can be derived from factual data about homes for sale shortlisted by the user. In some implementations, user preferences can be derived by analyzing user speech recorded during physical walkthroughs of properties (e.g., analyzing experiential data obtained via XR systems during walkthroughs of properties).

At block 906, process 900 can access experiential data obtained from the properties. Experiential data can be obtained during in-person walkthroughs of the properties, for example while the user is physically located at the properties. The experiential data can be obtained via an XR system or any other suitable system(s). In some implementations, the experiential data is obtained via performing process 800 of FIG. 8. Experiential data can include natural language spoken by the user, target(s) resolved for the natural language, tracked user gaze, tracked biometric information, and other suitable data. In some implementations, experiential data obtained via an XR system further comprises tracking of the user's one or more eyes while the user experiences the one or more properties.

At block 908, process 900 can generate user favorability metrics for the properties. For example, user favorability metrics for the properties can be predicted by analyzing the experiential data obtained from the properties. In some implementations, one or more natural language processing models can predict, using the natural language spoken by the user while experiencing each of the one or more properties, user favorability metrics associated with the properties. Examples of user favorability metrics for a property can include: an estimated cost for purchasing and/or updating the residential property, the user's disposition towards portions of the property (e.g., kitchen, master bedroom, outdoor space, living area, etc.), the user's disposition towards the property location, the user's disposition on the property floorplan (e.g., room sizes, basement, layout, etc.), the user's disposition on the natural light within the property, and other suitable favorability metrics.

In some implementations, predicting the user favorability metrics can include: analyzing the experiential data for a first of the one or more properties to derive property improvement predictions; and estimating a cost for the property improvement predictions for the first property, where at least one of the favorability metrics includes the estimated cost. For example, the experiential data for the first property can include context for the user eye tracking and the natural language spoken by the user, the XR system derives the context by resolving user gaze based on the user eye tracking and recognizing portions of the first property targeted by the user gaze, and the property improvement predictions are derived by correlating natural language spoken by the user to recognized portions of the first property targeted by the user gaze. In some implementations, the property improvement predictions comprise upgrades or renovations to the recognized portions of the first property correlated to the natural language spoken by the user.

In some implementations, the property improvement predictions can be provided to the user, and the property improvement predictions can be updated in response to user input, where the updating comprises removing one or more of the property improvement predictions and/or altering a scale of one or more of the property improvement predictions. For example, the property improvement predictions can be provided to the user and the property improvement predictions can be updated prior to generating a prioritized ranking of the properties.

At block 910, process 900 can generate a prioritized ranking of the properties. For example, one or more analytical models can generate a prioritized ranking of the one or more properties using the factual data about the one or more properties, the user defined preferences, and the predicted user favorability metrics. In some implementations, the prioritized ranking is generated by comparing the factual data about the properties and the predicted user favorability metrics to the user preferences. For example, properties that comprise factual data and/or user favorability metrics that meet a greater number of user preferences can be ranked higher in the prioritized ranking. In some implementations, the user preferences are grouped into multiple priority levels, and the prioritized ranking is generated by comparing the factual data about the properties and the predicted user favorability metrics to the groups of user preferences.

In some implementations, the predicted favorability metrics comprise at least a predicted aggregate budget metric that is a combination of a predicted sale price of a first property and an estimated cost of property improvement predictions for the first property. The user preferences can include at least a user defined overall budget, and the prioritized ranking can be generated in part based on a comparison between the predicted aggregate budget metric and the user defined overall budget.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:
1. A method for generating personalized property recommendations using machine learning and artificial reality (XR), the method comprising:
   receiving factual data about one or more properties and user preferences comprising characteristics of a user preferred property;
   obtaining, via an XR system, experiential data indicative of a user's experience while the user was located at each of the one or more properties, wherein the experiential data comprises at least natural language spoken by the user while experiencing the one or more properties;
   predicting, by one or more natural language processing models using the natural language spoken by the user while experiencing each of the one or more properties, user favorability metrics associated with the properties, wherein at least one user favorability metric is predicted by:

analyzing the experiential data for a first of the one or more properties to derive a property improvement prediction, the experiential data for the first property comprising user eye tracking data, wherein the analyzing correlates a) first natural language determined, by the one or more natural language processing models, to be indicative of property improvement with b) a target resolved from the user's eye tracking at a time of detection of the first natural language; and estimating a cost for the property improvement prediction;

displaying, via the XR system, a virtual visualization that simulates the property improvement prediction; and generating, by one or more analytical models, a prioritized ranking of the one or more properties using the factual data about the one or more properties, the user preferences, and the predicted user favorability metrics.

2. The method of claim 1, wherein the one or more properties comprise homes for sale, the factual data about the one or more properties comprises information about a physical home structure, and the experiential data is obtained by the XR system during physical walkthroughs by the user of the homes for sale.

3. The method of claim 2, further comprising:

recording, by the XR system, the physical walkthroughs of the homes for sale, wherein the recorded walkthroughs comprise: a) video of the physical walkthroughs from the user's perspective, and b) sound recorded during the physical walkthroughs, wherein, the recorded walkthroughs are stored at a cloud system, and the recorded walkthroughs are configured for streaming and playback as:

1) Two-dimensional video; and/or 2) immersive three-dimensional experiences.

4. The method of claim 1, wherein the experiential data is obtained, via the XR system, by tracking the user's one or more eyes, while the user experiences the one or more properties, in relation to identified features of each of the one or more properties.

5. The method of claim 1, wherein the property improvement prediction comprises one or more upgrades or renovations to a portion of the first property that is targeted by the user's eye tracking at the time of detection of the first natural language.

6. The method of claim 1, further comprising:

providing, prior to generating the prioritized ranking, the property improvement prediction to the user; and updating, prior to generating the prioritized ranking, the property improvement prediction in response to user input, wherein the updating comprises altering a scale of the property improvement prediction.

7. The method of claim 1, wherein the predicted favorability metrics comprise at least a predicted aggregate budget metric that is a combination of a predicted sale price of the first property and the estimated cost of the property improvement prediction for the first property.

8. The method of claim 7, wherein:

the user preferences comprise at least a user defined overall budget; and the prioritized ranking is generated in part based on a comparison between the predicted aggregate budget metric and the user defined overall budget.

9. The method of claim 1, wherein the user preferences are grouped into multiple priority levels, and the prioritized ranking is generated by comparing the factual data about the properties and the predicted user favorability metrics to the groups of user preferences.

10. The method of claim 1, wherein scanned versions of furniture in a current home of the user are stored, and wherein the virtual visualization includes virtual representations of the user's furniture generated based on the scanned versions of the furniture.

11. The method of claim 10, wherein the virtual visualization that includes the virtual representations of the user's furniture comprises an augmented reality or mixed reality environment.

12. The method of claim 1, wherein the derived property improvement prediction comprises a property improvement that alters a floorplan of the first property, and wherein the altered floorplan reflects a change in a number of rooms of the first property and/or a change to a size of a room of the first property.

13. The method of claim 12, wherein the virtual visualization comprises a virtual reality environment that visualizes the altered floorplan.

14. A computer-readable storage medium storing instructions that, when executed by a computing system, cause the computing system to perform a process for generating personalized property recommendations using machine learning and artificial reality (XR), the process comprising:

receiving factual data about one or more properties and user preferences comprising characteristics of a user preferred property;

obtaining, via an XR system, experiential data indicative of a user's experience while the user was located at each of the one or more properties, wherein the experiential data comprises at least natural language spoken by the user while experiencing the one or more properties;

predicting, by one or more natural language processing models using the natural language spoken by the user while experiencing each of the one or more properties, user favorability metrics associated with the properties, wherein at least one user favorability metric is predicted by:

analyzing the experiential data for a first of the one or more properties to derive a property improvement prediction, the experiential data for the first property comprising user eye tracking data, wherein the analyzing correlates a) first natural language determined, by the one or more natural language processing models, to be indicative of property improvement with b) a target resolved from the user's eye tracking at a time of detection of the first natural language; and estimating a cost for the property improvement prediction;

displaying, via the XR system, a virtual visualization that simulates the property improvement prediction; and generating, by one or more analytical models, a prioritized ranking of the one or more properties using the factual data about the one or more properties, the user preferences, and the predicted user favorability metrics.

15. The computer-readable storage medium of claim 14, wherein the one or more properties comprise homes for sale, the factual data about the one or more properties comprises information about a physical home structure, and the experiential data is obtained by the XR system during physical walkthroughs by the user of the homes for sale.

16. The computer-readable storage medium of claim 15, wherein the process further comprises:

recording, by the XR system, the physical walkthroughs of the homes for sale, wherein the recorded walk-throughs comprise: a) video of the physical walk-throughs from the user's perspective, and b) sound recorded during the physical walkthroughs, wherein, the recorded walkthroughs are stored at a cloud system, and the recorded walkthroughs are configured for streaming and playback as:

1) Two-dimensional video; and/or 2) immersive three-dimensional video.

17. The computer-readable storage medium of claim 14, wherein the experiential data is obtained, via the XR system, by tracking the user's one or more eyes, while the user experiences the one or more properties, in relation to iden-tified features of each of the one or more properties.

18. The computer-readable storage medium of claim 14, wherein the property improvement prediction comprises one or more upgrades or renovations to a portion of the first property that is targeted by the user's eye tracking at the time of detection of the first natural language.

19. The computer-readable storage medium of claim 14, wherein the one or more properties comprise commercial properties, the factual data about the one or more properties comprises information about a building structure, and the experiential data is obtained by the XR system during physical walkthroughs by the user of the building structure.

20. A computing system for generating personalized prop-erty recommendations using machine learning and artificial reality (XR), the computing system comprising:

one or more processors; and one or more memories storing instructions that, when executed by the one or more processors, cause the computing system to perform a process comprising:

receiving factual data about one or more properties and user preferences comprising characteristics of a user preferred property;

obtaining, via an XR system, experiential data indica-tive of a user's experience while the user was located at each of the one or more properties, wherein the experiential data comprises at least natural language spoken by the user while experiencing the one or more properties;

predicting, by one or more natural language processing models using the natural language spoken by the user while experiencing each of the one or more proper-ties, user favorability metrics associated with the properties, wherein at least one user favorability metric is predicted by:

analyzing the experiential data for a first of the one or more properties to derive a property improve-ment prediction, the experiential data for the first property comprising user eye tracking data, wherein the analyzing correlates a) first natural language determined, by the one or more natural language processing models, to be indicative of property improvement with b) a target resolved from the user's eye tracking at a time of detection of the first natural language; and estimating a cost for the property improvement pre-diction; and generating, by one or more analytical models, a priori-tized ranking of the one or more properties using the factual data about the one or more properties, the user preferences, and the predicted user favorability metrics.

\* \* \* \* \*